(12) United States Patent
Hessman et al.

(10) Patent No.: US 7,063,487 B2
(45) Date of Patent: Jun. 20, 2006

(54) TOOL AND CUTTING INSERT FOR THE FINE TURNING OF GROOVES IN WORKPIECES

(75) Inventors: Ingemar Hessman, Sandviken (SE); Kenneth Lundberg, Gimo (SE); Ove Lund, Arsunda (SE); Carl-Göran Petersson, Lindome (SE); Anders Wretland, Västra Frölunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/799,680

(22) Filed: Mar. 15, 2004

(65) Prior Publication Data

US 2004/0265074 A1    Dec. 30, 2004

(30) Foreign Application Priority Data

Mar. 14, 2003   (SE)   .................................... 0300696

(51) Int. Cl.
    *B23B 27/16*   (2006.01)
(52) U.S. Cl. .......................... 407/11; 407/103; 407/113
(58) Field of Classification Search .................. 407/11, 407/66, 102, 103, 107, 113; 82/158
    See application file for complete search history.

(56) References Cited

U.S. PATENT DOCUMENTS

| | | | |
|---|---|---|---|
| 4,512,689 A | | 4/1985 | Bylund |
| 5,354,156 A | * | 10/1994 | von Haas et al. ............ 408/223 |
| 5,536,119 A | * | 7/1996 | Werner et al. ................ 407/36 |
| 5,846,954 A | | 12/1998 | Joullié et al. |
| 5,931,613 A | * | 8/1999 | Larsson ....................... 407/103 |
| 6,065,938 A | | 5/2000 | Bartsch |
| 6,146,060 A | * | 11/2000 | Rydberg et al. ............... 407/40 |
| 6,273,650 B1 | * | 8/2001 | Jordberg ...................... 407/102 |
| 6,312,199 B1 | * | 11/2001 | Sjoden et al. .................. 407/11 |
| 6,409,435 B1 | | 6/2002 | Kocherovsky et al. |
| 6,439,851 B1 | | 8/2002 | Wong |
| 6,443,672 B1 | * | 9/2002 | Lagerberg ...................... 407/2 |
| 6,471,448 B1 | | 10/2002 | Lagerberg |
| 6,708,590 B1 | * | 3/2004 | Lagerberg ...................... 82/50 |
| 6,736,574 B1 | * | 5/2004 | Persson et al. ............... 407/77 |
| 6,796,207 B1 | * | 9/2004 | Long et al. ................... 82/158 |
| 2002/0094245 A1 | * | 7/2002 | Schlemmer et al. .......... 407/66 |
| 2004/0162312 A1 | * | 8/2004 | Hole et al. .................. 407/101 |

FOREIGN PATENT DOCUMENTS

DE          42 44 316        6/1994

* cited by examiner

*Primary Examiner*—Boyer D. Ashley
*Assistant Examiner*—Sara Addisu
(74) *Attorney, Agent, or Firm*—Drinker Biddle & Reath LLP

(57) ABSTRACT

A tool for the fine-turning of grooves in workpieces including a basic body having a rearwardly extending mounting part, and a forwardly projecting bracket. The bracket includes a narrow neck part and an enlarged support part disposed at an end of the neck part. The support part, which forms an insert seat, extends laterally from the neck part wherein the seat is arranged asymmetrically with respect to an imaginary center line of the basic body. A cutting insert includes a bottom side supported on the insert seat. The insert includes two spaced apart convexly arched side cutting edges arranged so that the imaginary center line passes therebetween. A hole is provided through the insert for receiving a fastening screw. The bottom side and the insert seat include mutually engaging stabilizing structures preventing angular displacement of the insert about an axis of the hole.

26 Claims, 9 Drawing Sheets

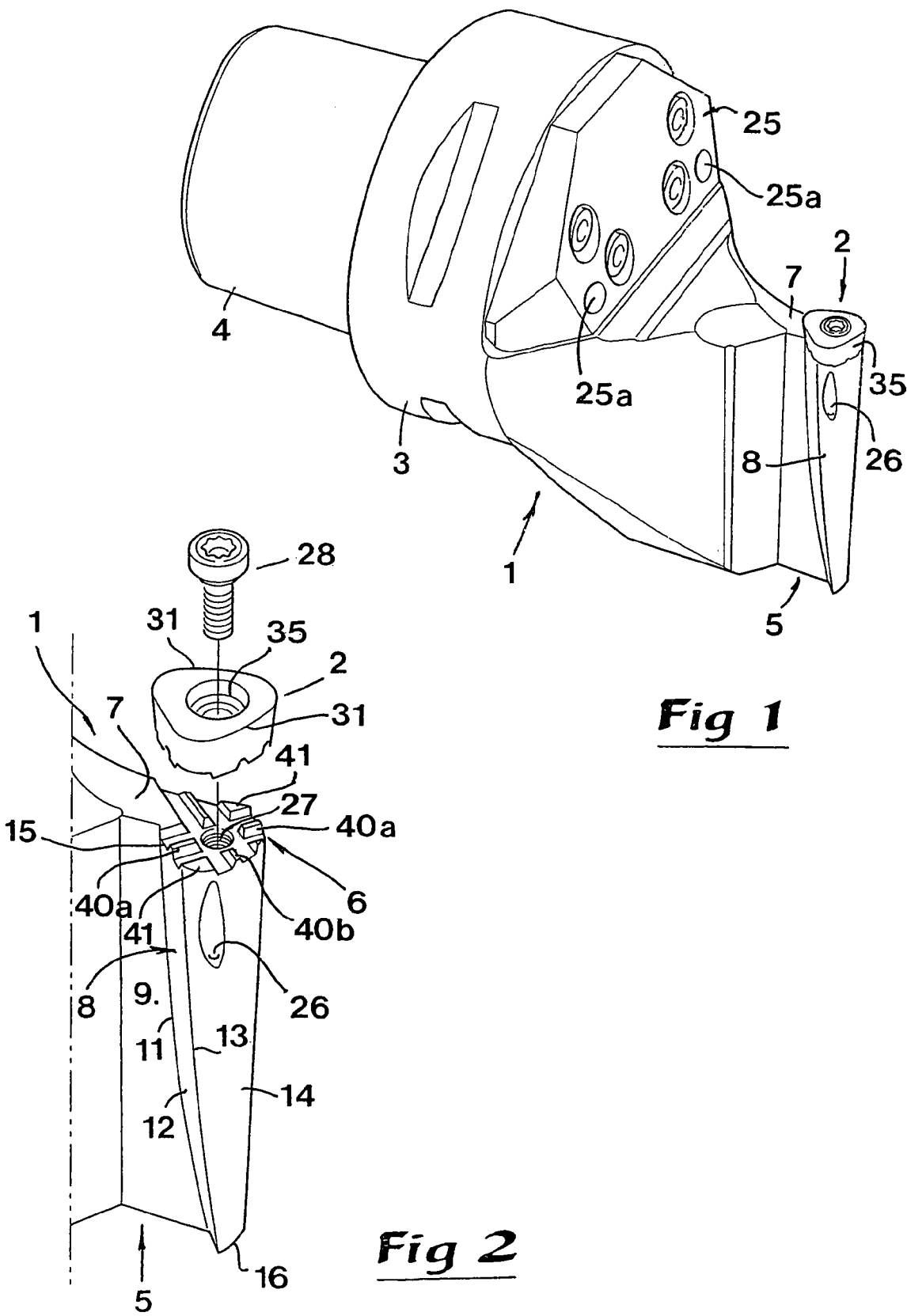

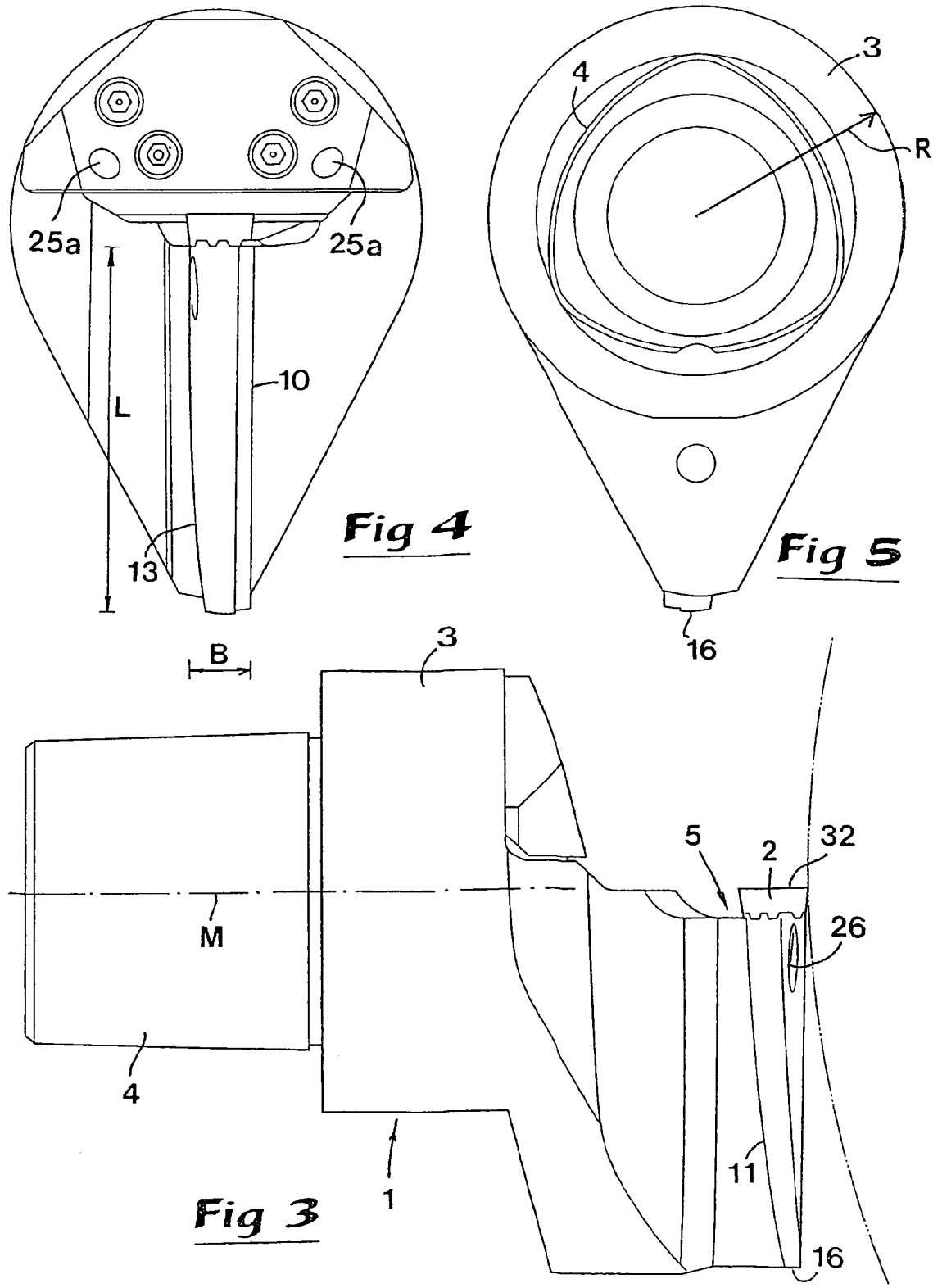

TOOL AND CUTTING INSERT FOR THE FINE TURNING OF GROOVES IN WORKPIECES

This application claims priority under 35 U.S.C. §§ 119 and/or 365 to Patent Application Serial No. 0300696-2 filed in Sweden on Mar. 14, 2003, the entire content of which is hereby incorporated by reference.

1. Technical Field of the Invention

In a first aspect, this invention relates to a tool for the fine turning of rotationally symmetrical grooves in workpieces comprising a basic body and a cutting insert, which is delimited by a top side, a bottom side and at least one clearance surface between the same, and which can be fixed in a cutting seat disposed on a bracket included in the basic body. The bracket includes a narrow neck tart and a support part protruding laterally from the same with the purpose of supporting a portion of the cutting insert protruding laterally in relation to the neck part. That enables, in a workpiece, the turning of internal shoulder surfaces of a hollow space countersunk inside a narrow gap of a groove and having a greater width than the gap.

In a second aspect, the invention also relates to a cutting insert for use in the tool according to the invention.

2. Description of the Prior Art

In workpieces having rotationally symmetrical, e.g. cylindrical or conical envelope surfaces, grooves are at times formed having a generally dovetail-like cross-section shape, which have the purpose of securing or clamping fastening elements to different details protruding from the envelope surface on the product which is to be manufactured. Examples of products having such grooves are accounted for in Joullie et al. U.S. Pat. No. 5,846,054, Bartsch U.S. Pat. No. 6,065,938, and Wong U.S. Pat. No. 6,439,851. More precisely, the individual fastening element should be capable of insertion into the groove in order to secure the detail, e.g. a fan blade, against centrifugal forces, which tend to throw out the detail radially from the product when the same rotates. The individual groove includes a relatively narrow gap, which opens in the surface of the product or of the workpiece, as well as a hollow space located deeper in the material, which is wider than the gap. Said hollow space is delimited by a bottom surface and two usually concavely curved side surfaces. The side surfaces transform into limiting surfaces of the gap via shoulder surfaces, which are inclined in relation to a radial plane or symmetry plane through the groove and against which out-turned, and likewise inclined, surfaces on the fastening elements are pressed when the details are exposed to centrifugal forces. Furthermore, in the bottom surface of the hollow space, a shallow countersink is formed, which forms a clearance for the cutting tool during final machining. In some applications, the finished products or construction parts, which are formed from a workpiece, are thin-walled and simultaneously subjected to extreme requirements on strength and durability. Furthermore, the requirements of dimensional accuracy of the finished construction parts may be utmost great, e.g. in order to prevent the detail in question from swinging up or down or in order to attain an exact, desired positioning of the same.

For the above reasons, it is exceptionally important that the limiting surfaces of the hollow space and above all the two inclined shoulder surfaces are finished to precise surface finish or smoothness without the machining giving rise to surface damage or defects which later could cause different types of inner damage in the material, e.g. crack formation.

Machining of the grooves is carried out principally in three main steps, viz. rough-turning, turning of the clearance countersink, as well as fine turning. The rough-turning operation has the purpose of forming an initial groove, the generic cross-section shape of which is dovetail-like without the final, exact dimensions having been attained. For this purpose, at least one tool is used which first rough-turns a groove having parallel side limiting surfaces. In the bottom surface of said groove, a shallow, central countersink is turned by means of a tool having a round cutting insert. Then, laterally turning cutting inserts are brought out towards each side more precisely with the purpose of providing a countersunk hollow space that is wider than an outer gap.

When this has taken place, finishing follows, more precisely by means of a number of turning tools having a cutting insert which in analogy with the rough-turning operation first is brought in a radial direction in the groove and then is brought perpendicularly to the radial plane (i.e. in the axial direction in respect of the rotational axis of the workpiece). Previously known fine turning tools of the same type generally are in the form of a long narrow shaft which at the outer, free end thereof has been formed with a recess (approximately down to a depth which equals half the diameter of the shaft), in order to form a seat or an anvil surface on which a cutting insert of a harder material than the shaft can be fixed. More precisely, the fixation of the cutting insert is carried out by soldering. This means, among other things, that the removal of a worn out cutting insert becomes intricate.

Alternatively, the cutting insert connected by soldering can partially be reground after wearing down of the cutting edge, but this is no attractive alternative because the precision of the cutting edge then is lost as a consequence of the profile of the cutting edge being reduced by the regrinding.

Furthermore, characteristic of previously known finishing tools is that the contour shape of the final cutting insert, more precisely the contour shape of the arched cutting edge that finally should machine the interior of the hollow space, should have the same contour shape as the cross-section profile shape of the finished surface in the hollow space that is to be formed. That the profile shapes of the hollow space and of the cutting edge correspond with each other implies in practice a plurality of problems, of which the most conspicuous one consists of chip stopping.

Thus, in the previously known fine turning tools chip stopping may easily arise, if the operator does not help to guide the chip out of the groove above all when one half of the chip profile already has been formed. Such chip stopping represents an obvious risk that the machined surfaces are scratched. Thus, an important number of more or less marked scratches may at times arise. These may in turn sooner or later give rise to crack formations in the material when the completed product rotates during operation. In, for instance, coils to jet engines, tendencies to crack formation in the material may become disastrous because the stresses on a coil with fan blades usually are extreme. Thus, such a coil may rotate at more than 10,000 revolutions/minute and operate within a temperature range of about 400° C. (from approx. −50° C. to approx. +350° C.).

Therefore, with the purpose of counteracting the risk of crack formations or other defects, in previously known techniques an extensive after-treatment is carried out, for instance in the form of peening and/or polishing/burnishing. Such after-treatment is, however, exceptionally time-consuming and cost-demanding.

Another problem in fine turning by means of previously known turning tools is that the machined surfaces tend to become wavy. A probable reason for this is that the basic body of the tool, i.e. the long narrow shaft, is comparatively weak, whereby the cutting insert is not kept fixed in an exactly desired position, in particular when the tool is exposed to large cutting forces, something that is the case when the hollow spaces of the grooves are rough and deeply countersunk.

An additional problem of the known fine turning technique is that the tools demand long set-up times and require the lifting of a plurality of heavy complete tool carriers, and in addition to which the cutting inserts must be adjusted and fixed in desired positions. This problem becomes particularly marked because the fine turning operation demands extremely many (in certain cases 14 or more) different tools having different, successively increasing sizes, which have to be individually set and be fixed as the machining operation proceeds.

3. Objects and Features of the Invention

The present invention aims at obviating the above-mentioned problems and at providing an improved tool as well as an improved cutting insert for the tine turning of grooves of the type in question. Therefore, a primary object of the invention is to provide a tool that enables fine turning of the hollow spaces of the grooves in such a way that the internal surfaces of the hollow space become smooth and precise with the purpose of eliminating or reducing the need for after-treatment. It is also an object to provide a tool by means of which the risk of chip stopping in the hollow spaces is obviated. An additional object is to provide a tool that enables a considerable reduction of the number of machining steps between the first and the last machining step. An additional object of the invention is to provide a tool that can be mounted and dismounted with minimal set-up times.

SUMMARY OF THE INVENTION

One aspect of the present invention relates to a tool for the fine-turning of grooves in work pieces. The tool comprises a base body and a cutting insert mounted thereon. The base body includes a rearwardly extending mounting part, and a forwardly projecting bracket. The bracket includes a narrow neck part and an enlarged support part disposed at an end of the neck part. The support part forms an insert seat. The support part extends laterally from the neck part wherein the support part is arranged asymmetrically with respect to a center line of the basic body, which center line extends in a front-to-rear direction through the neck part and the mounting part. The cutting insert includes a top side, a bottom side and a peripheral clearance surface extending between the top and bottom sides. The bottom side is supported on the insert seat. The insert includes two spaced apart convexly arched side cutting edges arranged wherein the center line passes therebetween. A hole is provided in the insert for receiving a fastening screw. The bottom side and the insert seat include mutually engaging stabilizing structures preventing angular displacement of the insert about an axis of the hole.

The invention also involves a cutting insert comprising a top side, a bottom side and a peripheral clearance surface extending between the top and bottom sides. A hole extends from the top side to the bottom side for receiving a fastener. The top side has first and second spaced apart convexly arch-shaped cutting edges. The bottom side includes stabilizing structure arranged for preventing angular displacement of the insert about an axis of the hole.

DESCRIPTION OF THE DRAWINGS

The objects and advantages of the invention will become apparent from the following detailed description of preferred embodiments thereof in connection with the accompanying drawings, in which like numerals designate like elements, and in which:

FIG. 1 is a perspective view of a tool according to the invention seen obliquely from the front, FIG. 2 is a partial, perspective exploded view showing a cutting insert included in the tool separated from a cutting seat in the basic body of the tool, FIG. 3 is a side view of the tool according to FIG. 1, FIG. 4 is an end view of the tool seen from the front, FIG. 5 is an end view of the tool seen from behind.

DESCRIPTION OF PREFERRED EMBODIMENTS OF THE INVENTION

Figure 6:
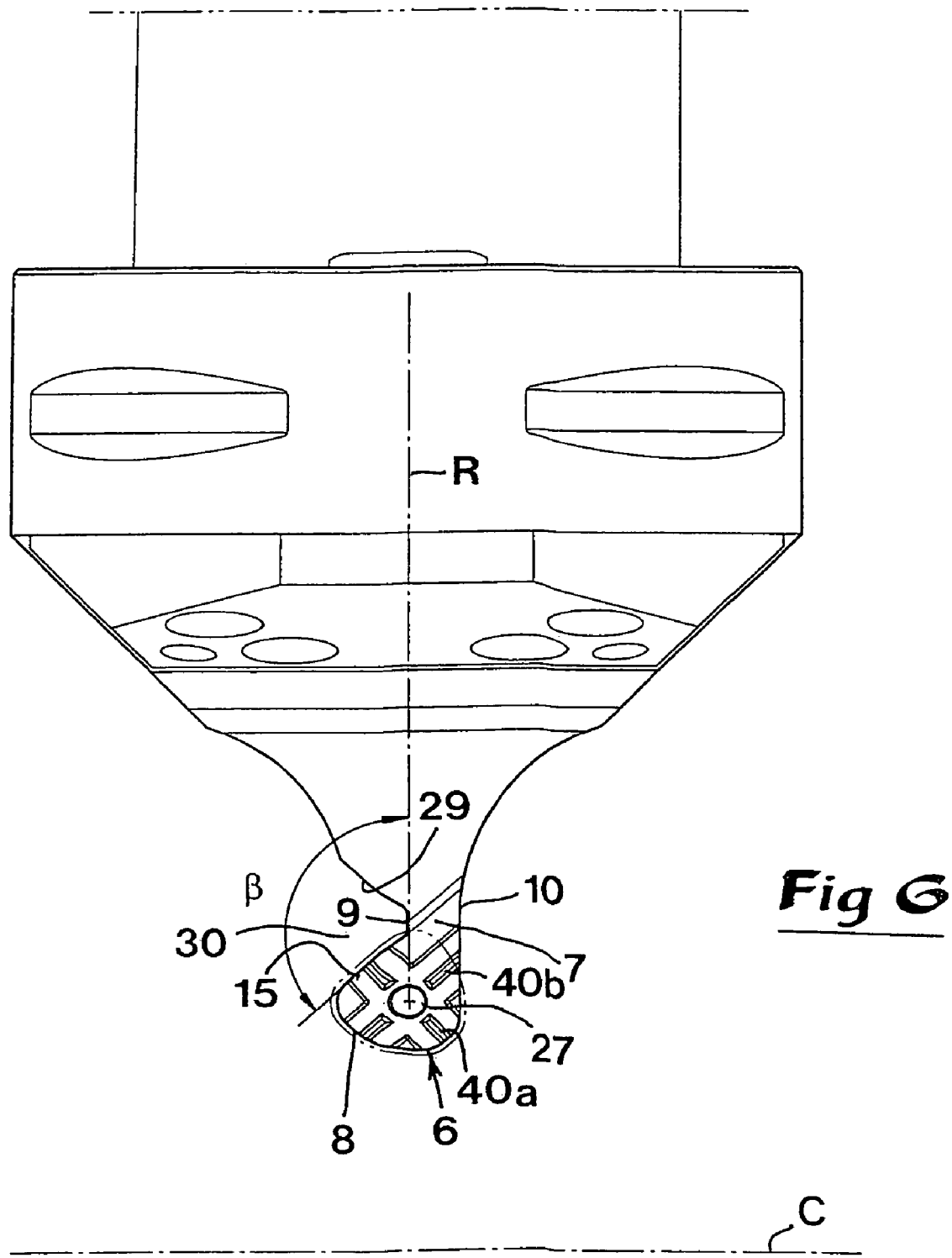
FIG. 6 is an enlarged planar view from above of the same tool.
Figure 7:
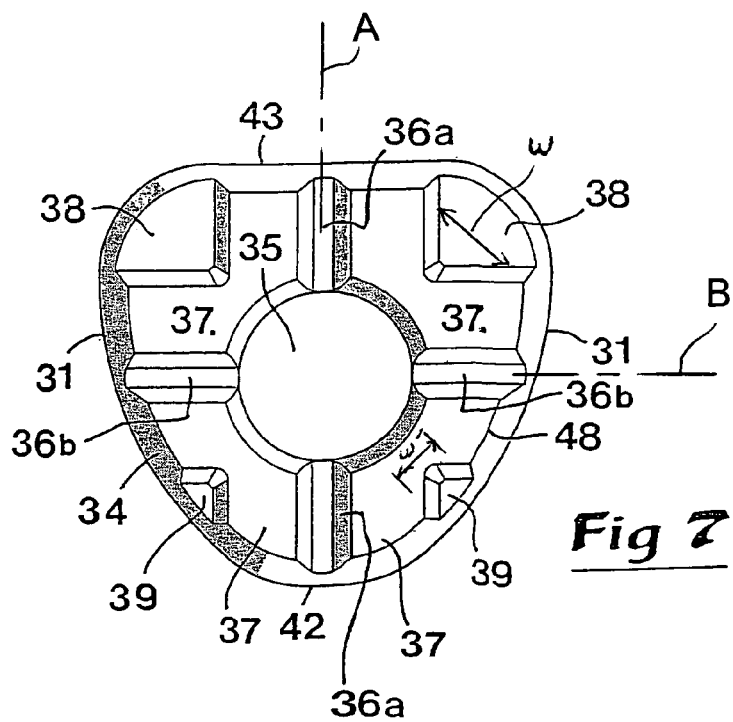
FIG. 7 is an enlarged planar view of the cutting insert of the tool seen from below.
Figure 8:
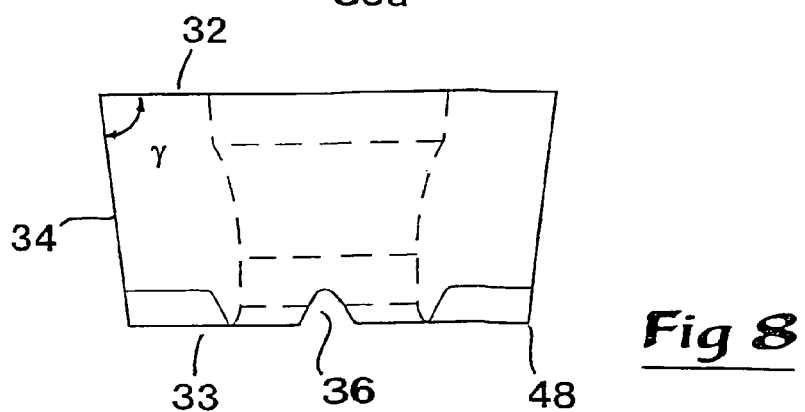
FIG. 8 is an end view of the cutting insert according to FIG. 7.
Figure 9:
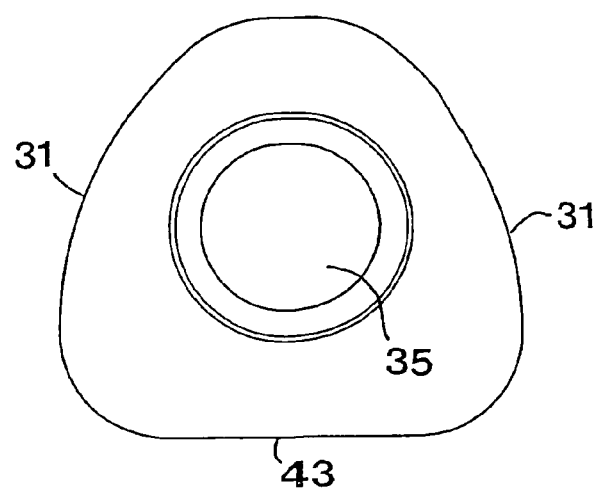
FIG. 9 is a planar view from above of the same cutting insert.

In FIGS. 1 and 2, a tool is shown in the form of a turning tool, which comprises a basic body 1 and a cutting insert 2, which is detachably mounted on the basic body. In the example, the basic body 1 includes a cylindrical main part 3 from the back side of which a coupling element 4 extends, which can be fixed in a machine tool (not shown). In the front, the basic body has a bracket 5 having a cutting seat 6 in which the cutting insert 2 can be fixed. Said bracket includes a narrow neck part 7 and a support part 8 protruding laterally from the same.

The cutting insert 2 will be described more in detail later with reference being made to FIGS. 7–10.

Now reference is also made to FIGS. 3–6, which together with FIGS. 1 and 2 illustrate the design of the bracket 5 in detail. In FIG. 6 is seen how the comparatively thin neck part 7 is delimited by two planar, opposite side surfaces 9, 10, which advantageously are mutually parallel. The support part 8 projects only from one of the sides of the neck part, viz. towards the right seen from the basic body. The right side surface 9 of the neck part 7 transforms via a transition line 11 (see FIGS. 2 and 3) into a limiting surface designated 12, which also is delimited by an edge line 13 distanced from the transition line 11. From said edge line, a convexly curved front surface 14 extends, which in the area thereof opposite the edge line 13 continuously transforms into the planar side surface 10 of the neck part 7. At the top, i.e. in connection with the cutting seat 5, the limiting surface 12 is planar, as is outlined by means of the straight edge line 15 in FIG. 6. The support part 8 tapers in the backward direction or downwards from the cutting seat 6 towards a lower end surface 16. More precisely, the support part tapers in two different planes, because not only the transition line 11, but also the edge line 13, is arched, as is clearly seen in FIG. 3 and FIG. 4 together. As a consequence of the edge line 13 having said arc-shape, the limiting surface 12 tapers in the direction from the cutting seat towards the lower end of the support part, the limiting surface simultaneously having a convexly curved shape in the longitudinal direction thereof (also cross-section-wise the limiting surface 12 may have a weakly curved shape).

In order to guarantee a good stability of the cutting insert during operation, the described bracket has a considerable length as measured from the cutting seat 6 to the lower end surface 16. Thus, in practice, the length L of the bracket (see FIG. 4) should be at least 3, suitably at least 5 times greater than the width B of the bracket as the latter is measured in the area of the cutting seat 6. In the example according to FIG. 4, the length L is approx. 5.6 times greater than the width B. In relation to the thickness of the cutting insert 2 (as measured between the top and bottom sides of the cutting insert), the length L of the bracket should be at least 5, suitably at least 10 times greater than the thickness of the cutting insert. In the example, the length of the bracket L is approximately 11 times greater than the thickness of the cutting insert.

Figure 12:
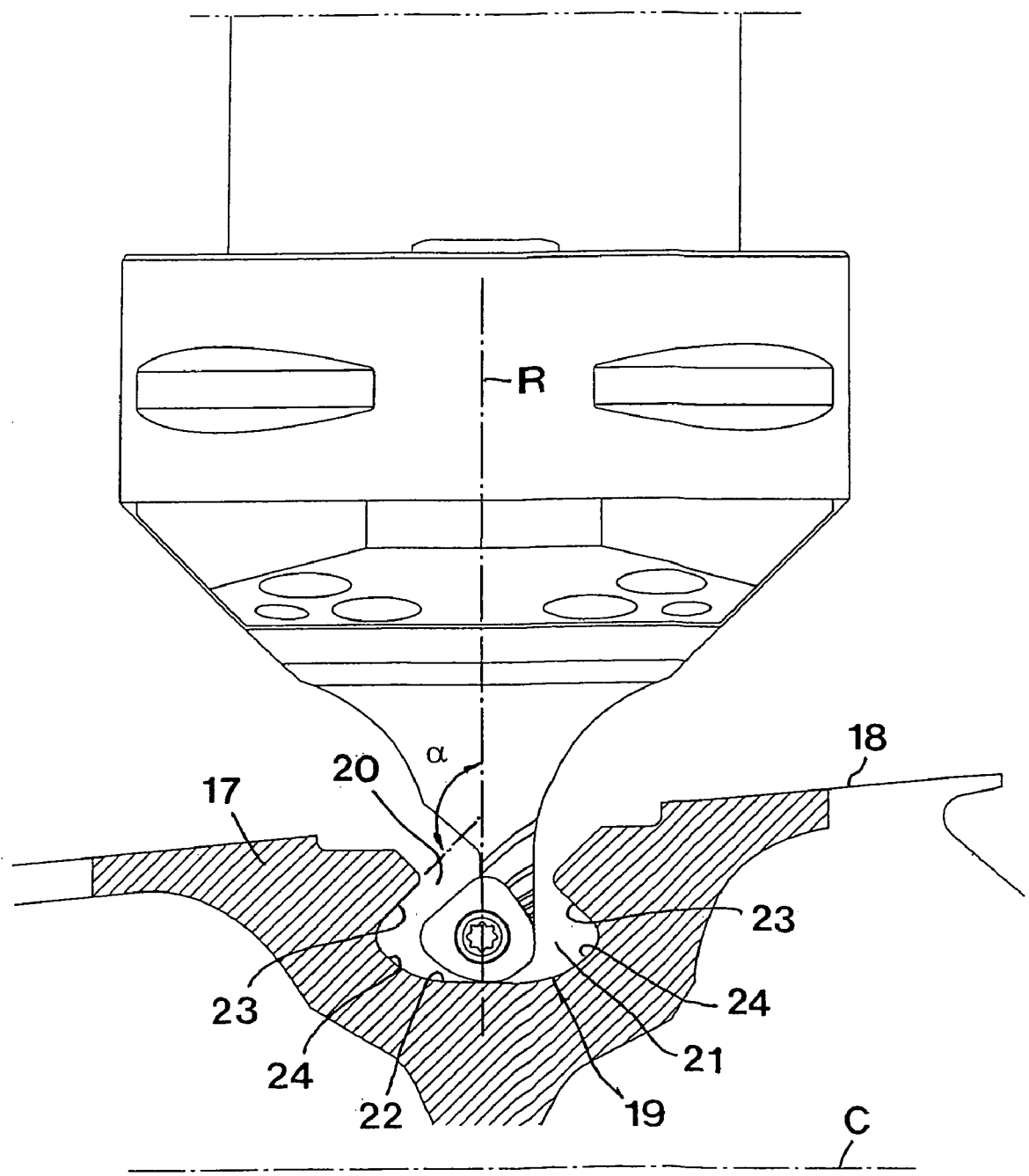
FIG. 12 is a planar view from above showing the tool during machining of a workpiece, wherein it should be noted that the cutting insert is right-hand mounted seen based on the basic body.
Figure 13:
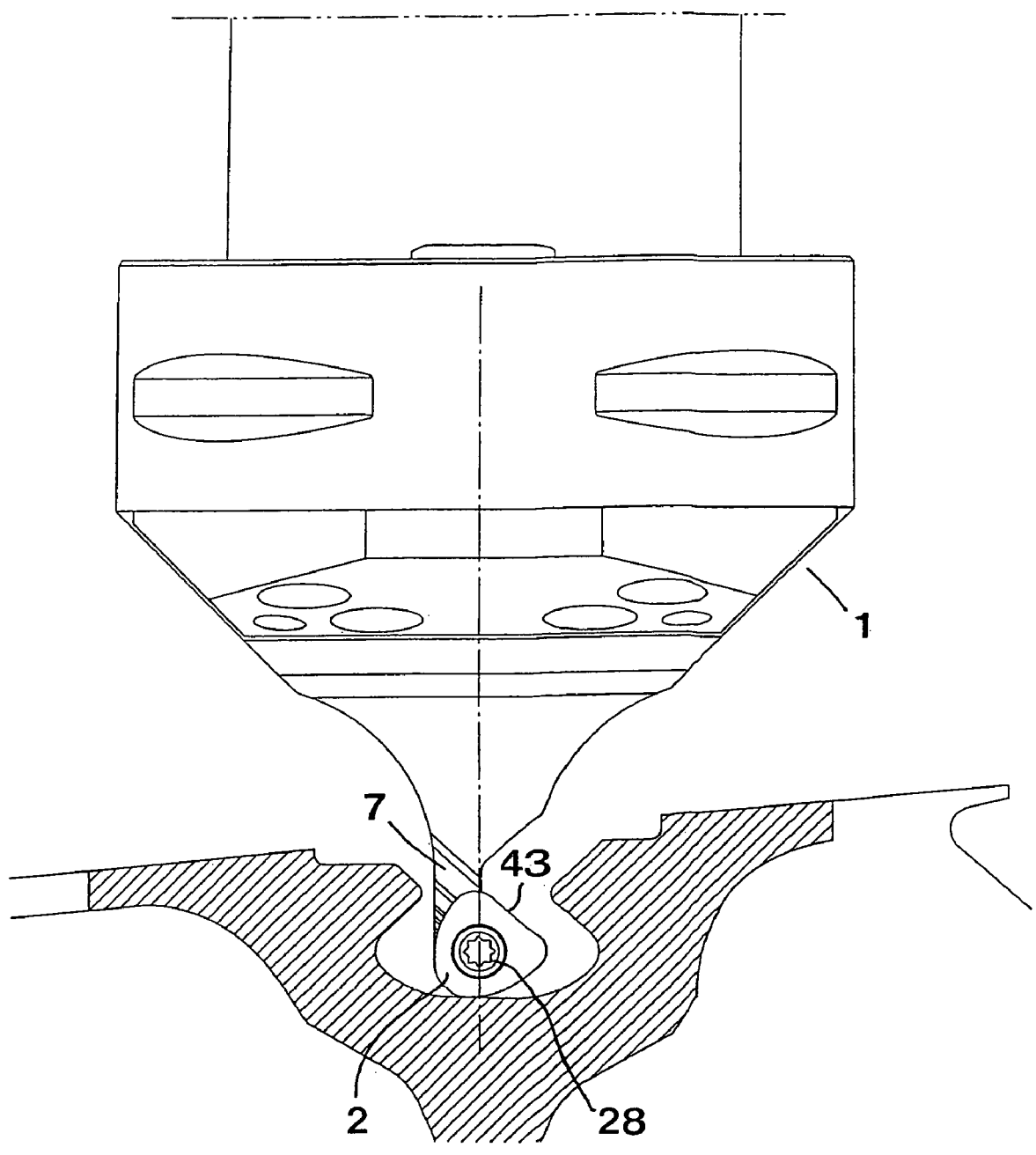
FIG. 13 is an analogous planar view showing an alternative embodiment having a left-hand mounted cutting insert.

Reference is now made to FIG. 12, which illustrates the turning tool according to the invention together with a workpiece 17 in the form of a so-called coil of a jet engine. Said workpiece has a rotationally symmetrical, more precisely conical envelope surface 18, in which continuous, ring-shaped grooves 19 should be shaped. During turning, the workpiece 17 rotates around a geometrical center axis that in reality is situated at a comparatively large distance from the envelope surface, but which for technical reasons of drawing, is shown by means of the dash-dotted line C fairly near the envelope surface. The individual groove 19 is formed with an outer gap 20 and a countersunk hollow space 21 located inside the same, which hollow space has a greater width than the gap 20. Said hollow space 21 is delimited by a bottom 22 and two concavely curved side limiting surfaces 24, which transform into planar shoulder surfaces 23, which are inclined obliquely in relation to the center axis C and converge in the direction outwards towards the gap 20.

A radial plane perpendicular to the rotational axis C of the workpiece 17 is in FIG. 12 designated R. That radial plane R coincides with a vertical, central reference plane through the tool. The designation R will therefore henceforth be used in order to denote the central reference plane through the tool as well as a radial plane through the gap. The radial plane R is located halfway between the two shoulder surfaces 23 and, forms therefore also a symmetry plane for the groove 19. In relation to said symmetry plane, the shoulder surfaces in the example extend at approx. 45° angle, the supplementary angle α thereof amounting to 135°.

Now reference is made again to FIGS. 1–6, FIG. 6 of which illustrates how the edge line 15, which partly defines the cutting seat 6, extends at an obtuse angle β to the reference plane R. Said angle β should always be smaller than the above-mentioned angle α. In the example shown, when the angle α is 135°, the angle β amounts to 132°. This means that the edge line 15 clears approx. 3° from the shoulder surface 23 of the hollow space 21.

Depending on the angle of inclination of the shoulder surfaces 23, the above-mentioned angle β may vary. However, it should amount to at least 125°, or preferably at least 130°, and at most 140°, or preferably at most 135°.

In FIGS. 3 and 5 is seen how the coupling element 4 on the back side of the cylinder part 3 tapers in the backward direction, as well as has a so-called polygon-shaped cross-section. More precisely, the cross-sectional shape of the element 4 is determined by three triangle-like, convexly curved main surfaces which transform into each other via rounded corners having considerably smaller bending radius than the main surfaces. A coupling element of this type (which is commercially available under the trade name COROMANT CAPTO®) guarantees an absolutely rigid connection between the tool and the appurtenant tool holder.

On the front side of the cylinder part 3 of the basic body 1, a nozzle plate 25 is arranged having a number of nozzles 25a (see FIGS. 1 and 4) by means of which a cooling fluid can be sprayed against the cutting insert 2, more precisely against the top side of the same. In the example, two nozzles 25a are included in the plate, viz. one to the left and one to the right, for spraying a fluid with low pressure. The plate could also be supplemented with high pressure nozzles. Furthermore, a cooling fluid conduit 26 mouths (opens) in the support part 8 of the bracket 5 with the purpose of spraying a cooling fluid against the cutting insert from below.

In FIG. 3, M designates an imaginary center line through the coupling element 4 and the cylindrical part 3 of the basic body 1. As is clearly seen in FIG. 3, the cutting insert 2 is located approximately on a level with said center line. More precisely, the top side of the cutting insert 2 is located in the extension of the center line M, the supporting bracket 5 for the cutting insert extending downwards relative to the center line M. Furthermore, the bracket has such a length that the lower portion of the same projects an important distance under the envelope surface of the cylinder part 3. Advantageously, the length L of the bracket is more than 50% greater than the circle radius for the envelope surface of the cylinder part 3.

With particular reference to FIG. 6, it should be pointed out that the side surface 9 of the neck part 7 is situated substantially in the reference plane R, i.e the central plane that intersects the basic body vertically. This means that the support part 8 in its entirety projects sidewards from the material portion that is delimited by the side surface 10 and an imaginary extension of the reference plane R. A threaded hole 27 for a fixing screw 28 (see FIG. 2) for fixation of the cutting insert is symmetrically located in relation to the reference plane R (i.e., the center of the hole is situated in the plane R). Between the inclined edge 15 of the support part 8 and a correspondingly inclined limiting surface 29 on the basic body, a cross-section-wise V-shaped space 30 is defined (see FIG. 6). If the surface 29 is inclined at the same angle to the reference plane R as the edge 15, then the angle of aperture of the V-space 30 will amount to 84°.

Characteristic of the cutting insert 2, which is visualized in detail in FIGS. 7–10, is that the same is indexable by including two spaced-apart, convexly arched and alternately applicable side cutting edges 31. In the usual way, the cutting insert is defined by a top side 32, a bottom side 33 and a peripheral clearance surface 34, which extends between the top side 32 and the bottom side 33. In the example, the top side 32 is planar, and the cutting insert has a positive cutting geometry thanks to the clearance surface 34 extending at an acute angle γ to the top side 32. In practice, the angle γ can amount to 83°, i.e. the clearance angle is 7°. In the cutting insert, a through hole 35 is formed for the aforementioned fixing screw 28.

On the bottom side thereof, the cutting insert is formed with stabilizing means in order to cooperate with analogous means of the cutting seat 6 prevent angular displacement of the cutting insert in the mounted state. Said stabilizing means may advantageously consist of so-called cross serrations in the form of either scores or ridges on the cutting insert for engagement with a corresponding number of ridges or scores in the cutting seat. In the example shown, the cutting insert is formed with two linear scores (recesses) 36a, 36b, which are oriented perpendicularly to each other while forming a cross-like configuration. Between nearby scores L-shaped lands 37 are defined. At the free corners of two of said lands, comparatively large quandrant-like corner countersinks 38 are formed, while the two other lands are formed with analogous corner countersinks 39 which are smaller than the countersinks 38. Each one of the two scores 36a, 36b is interrupted by the central hole 35. In other words, the individual score consists of two sections located in line with each other, which are distanced from each other via the hole. The recesses 36a, 36b lie on respective axes A, B that intersect one another at the center of the hole 35, wherein each recess comprises two sections disposed on opposite sides of the hole. The cutting edges 31, 31 are disposed on opposite sites of the axis A. The countersinks 38. 38 are disposed on opposite sides of one of the sections of the recess 36a and adjacent respective cutting edges 31, 31. Each countersink 38 has a width w which increases in a direction toward the respective cutting edge, and each countersink 39 also has a width w' which increases in a direction toward the respective cutting edge 31.

The cooperating coupling means in the cutting seat 6 consist of two ridges 40a, 40b (see FIG. 2), which extend at right angles to each other while forming a cross-like configuration of the same type as cross configuration of the scores 36a, 36b. The pair of ridges separate quadrants in which corner projections 41 are formed intended to engage the aforementioned corner countersinks 38, 39 in the cutting insert. Between the corner projections 41 and the ridges 40a, 40b, two pairs of mutually parallel grooves are defined in which the tooth 27 on the cutting insert can engage. The depth of the ridges 40a, 40b is somewhat smaller than the depth of the scores 36a, 36b. Also, the depth of the corner ridges 41 is somewhat smaller than the depth of the corner countersinks 38, 39. In this way it is guaranteed that the ridges and the projections do not bottom in the scores and the countersinks, respectively. Furthermore, it should be pointed out that all ridges and scores have chamfered or inclined side surfaces, which guarantee that the ridges are wedged up in the scores in connection with fixation of the cutting insert by tightening the screw 28. By means of the described coupling means, it is guaranteed that the cutting insert by the simple measure of fastening the screw is located in a very exactly defined position from which it is not dislodged by angular displacement or in another way. Therefore, in practice, the cutting insert can be mounted in the tool with a dimensional accuracy of 0.01 mm or finer.

Figure 10:
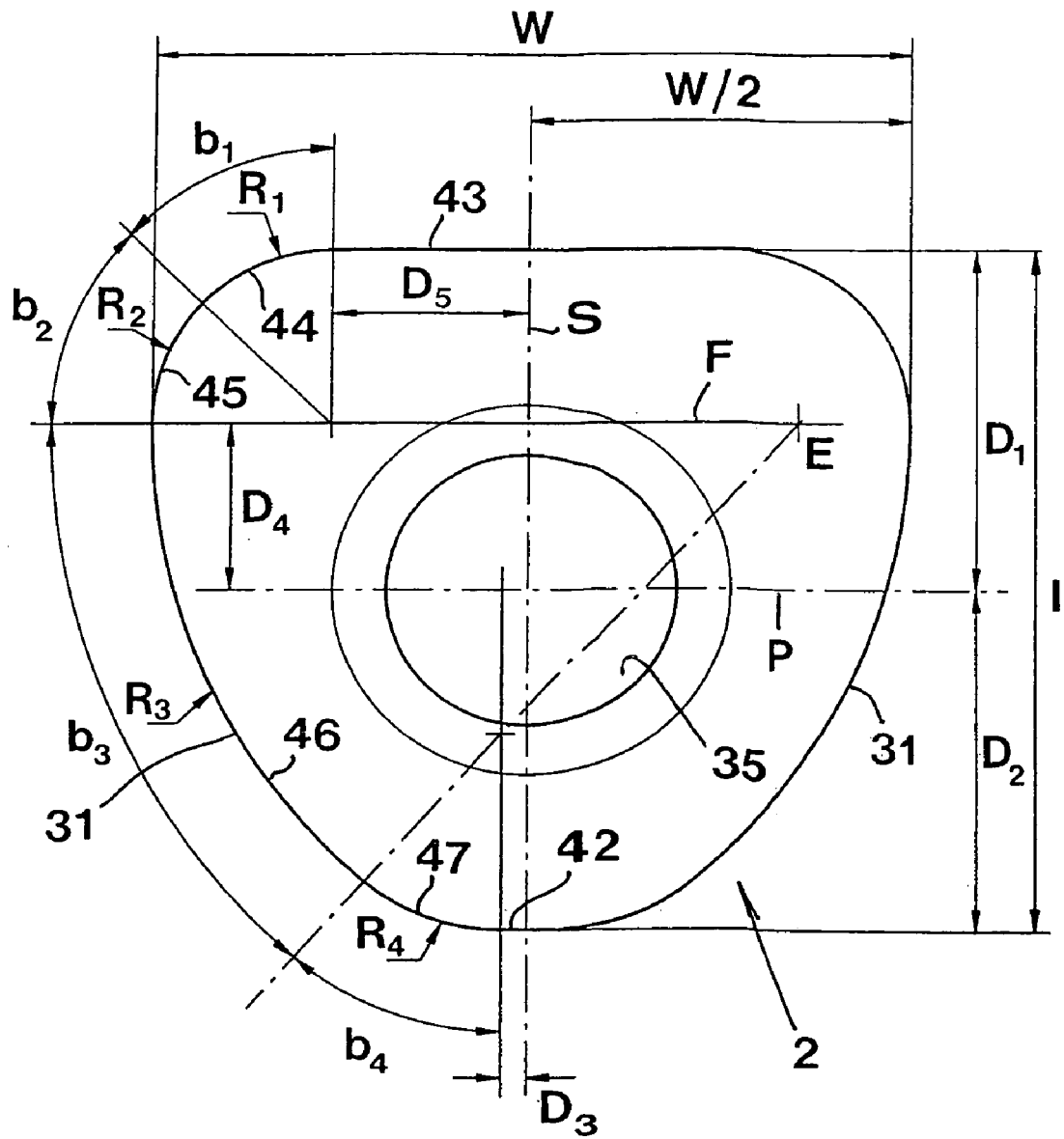
FIG. 10 is an additional enlarged planar view from above of the cutting insert, the geometry of the cutting insert being illustrated in detail.

As is best seen in FIG. 10, the cutting insert 2 has a generally heart-like contour shape, which is defined by the two side cutting edges 31 on both sides of a symmetry plane S, which intersects the center of the hole 35. Perpendicularly to the symmetry plane S, the center of the hole 27 is intersected by a second plane P. Because the two halves of the cutting insert that are spaced apart by the symmetry plane S are mirror-symmetrical, only one of the halves, viz. the left one in FIG. 10, will be described in detail. The cutting edges 31 extend between a common rear corner edge 42 and a front clearance edge 43, which in the example is straight. As is seen in FIG. 10, the cutting insert tapers from the area of the front clearance edge in the direction of the rear corner edge, more precisely as a consequence of the edge 43 being considerably longer than the edge 42.

Each individual side cutting edge 31 is composed of a plurality of part cutting edges 44, 45, 46 and 47, having different respective radii of curvature. Said part cutting edges are included, together with the cutting edges 42, 43, in a continuous edge side or cutting edge that is formed in the transition between the planar top side 32 of the cutting insert and the circumferential, smooth peripheral (clearance) surface 34. The contour shape of the bottom side 33, such as this is determined by a circumferential interruption line 48 (see FIGS. 7 and 8), corresponds generally to the contour shape of the cutting seat 6. This means that the clearance surface 34 of the cutting insert is located in flush with the external surface of the support part 8. In other words, the clearance surface 34 of the cutting insert connects to the outside of the support part 8 without forming any abrupt projections in the interface between the cutting insert and the support part. Because the cutting insert has a positive cutting geometry so far that the clearance surface 34 extends at the acute angle γ to the top side, the top side 32 receive a larger surface extension than the bottom side 33 (a projection of the outer edge of the top side 32 perpendicularly to the plane of the cutting insert is accordingly located outside the interruption line 48 from all sides).

It should be noted that the edges 42 and 43 (which both are straight) are parallel with each other.

Reference being made to FIG. 10, a specific example of the shape and the dimensions of a cutting insert according to the invention will follow below. In this case, the cutting insert has a width W of 9 mm (W/2=4.5 mm) and a length I of 8.5 mm. The distances $D_1$, $D_2$ between the plane P and the clearance edge 43 and the corner edge 42, respectively, is equally large and amounts to 4.25 mm. In other words, the center of the hole 35 is located halfway between the edges 42 and 43. The individual part cutting edge 46 is circular arc-shaped and has a radius $R_3$ of 7.6 mm. The corner edge 42 is straight and transforms into the part cutting edge 46 via a part cutting edge 47 having a radius $R_4$ of 2.5 mm. The distance D3 between the symmetry plane S and the point where the corner edge 42 transforms into the part cutting edge 47 amounts to 0.3 mm. The center E for the radius R3 of the part cutting edge 46 is situated to the right of the symmetry plane S and above the plane P. In other words, the individual part cutting edge 46 (which is longest of all part cutting edges 44, 45, 46, 47) has the center E thereof located on the half of the cutting insert defined by the symmetry plane S which is opposite said part edge, as well as on the front part of the cutting insert, i.e. between the plane P and the front clearance edge 43. From said point E, a line F extends perpendicularly to the symmetry plane S. Where said line F intersects the left edge of the cutting insert, the part cutting edge 46 transforms into a part cutting edge 45, which in turn transforms into the part cutting edge 44. The part cutting edge 45 has a radius $R_2$ of 2.1 mm and an arc angle $b_2$ of approx. 43.5°, while the part cutting edge 44 has a (somewhat larger) radius $R_1$ of 2.2 mm and an arc angle $b_1$ of 46.5°. The arc angle $b_3$ of the part cutting edge 46 amounts to 48.5°, while the arc angle $B_4$ of the part cutting edge 47 is 41.5°. The distance $D_4$ between the plane P and the point E amounts to 2.1 mm, while the distance $D_5$ (=half the length of the clearance edge 43) amounts to 2.3 mm. In other words, the clearance edge 43 has a length off 4.6 mm.

It is axiomatic that the formed cutting edges 31 are mirror-inverted and equidistantly distanced from the symmetry plane S. The first and second convex edges 31, 31 are spaced apart by the front edge 43 of the insert and disposed, respectively, on opposite sides of the symmetry plane S which intersects the front edge 43. Each of the first and second cutting edges defines a laterally outermost region 60 of the insert spaced farthest from the symmetry plane in a direction perpendicularly thereto. Each laterally outermost region is spaced from a second plane passing through the hole's center perpendicularly to the symmetry plane, such spacing $D_4$ being in a direction toward the front edge 43.

From what has been said above, it is clear that the bending radius $R_3$ of the longest part cutting edge 46 is greater than the bending radius of each one of the other part cutting edges 44, 45, 47. In the example, the bending radius $R_3$ is approximately 3 times greater than the second largest bending radius $R_4$. The relations between said radii of bending may vary, per se, but in all events the bending radius $R_3$ should be at least twice as large as the largest bending radius of the other part cutting edges.

Furthermore, it should be noted that the total arc angle ($b_1+b_2=90°$) for the part cutting edges 44, 45 is considerably greater than the arc angle ($b_3=48.5°$) for the longest part cutting edge 46.

Figure 11:
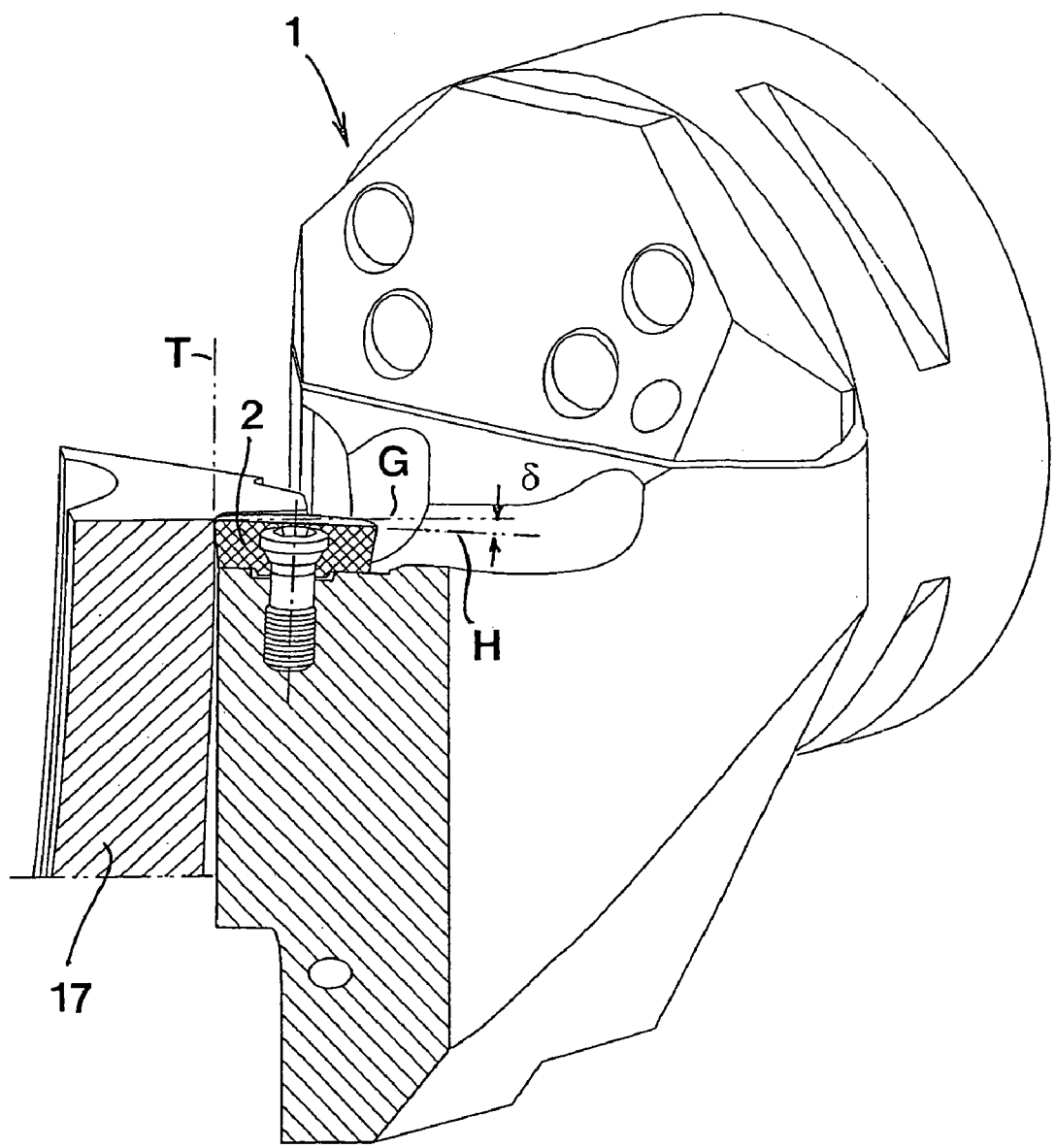
FIG. 11 is a partially cut perspective view showing the tool in connection with a partially shown workpiece.

In FIG. 11 the described tool is shown during machining of the workpiece 17. In the figure, T designates an imaginary tangent line to the circumferential circular groove 19, which is turned in the rotationally symmetrical workpiece, while the dash-dotted line G marks a plane perpendicular to the tangent line T. If the tangent line T is vertical, the plane G is accordingly horizontally oriented (the line G extends in the extension of an imaginary radius between the geometrical rotational axis of the workpiece and the periphery of the workpiece). As is shown by means of the line H, the cutting insert 2 is oriented at a certain, limited angle δ to the plane G said angle δ has to be smaller than the clearance angle of the cutting insert (i.e., less than 7°) and may in practice be within the range of 1–4°.

Function of the Tool According to the Invention During Turning

The function of the tool is described below, reference being made to FIGS. 13–16, which show a tool having a left-hand mounted cutting insert, in contrast to the tool designed for a right-hand mounted cutting insert shown in FIG. 12. In this connection, it should be pointed out that one and the same cutting insert according to the invention can universally be used for both types off tools, i.e. for right-hand cutting as well left-hand cutting tools.

Figure 14:
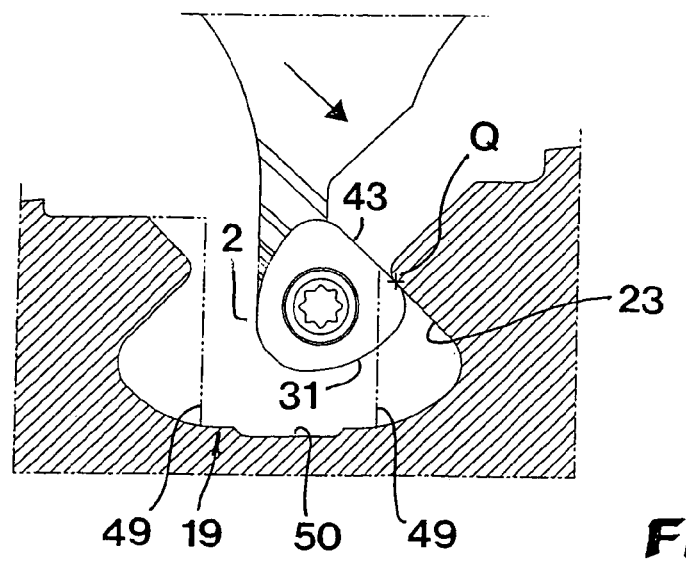
FIGS. 14–16 are partial planar views showing the tool in three different positions during operation.
Figure 15:
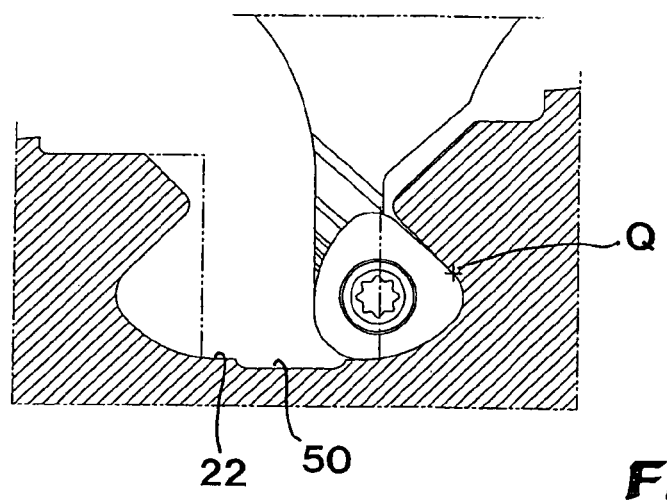
Figure 16:
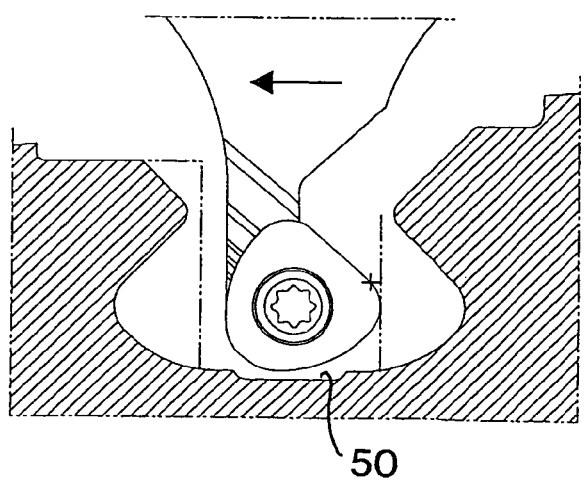

In a preparatory step, a groove having a quadrangular cross-section shape is rough-turned by means of a conventional, slotting tool (not shown), as is outlined by means of the parallel dash-dotted lines 49 in FIG. 14. In the next step, in the bottom surface of the groove a shallow countersink 50 is turned by means of a round cutting insert (not shown) in order to form a clearance. In practice, said countersink may have a depth of approx. 0.05 mm. After this, forming follows of the desired profile of the inner hollow space 21 that widens inwards in the workpiece. Said profile forming is begun with a machining of one side off the groove. More precisely, the cutting insert 2 is inserted obliquely from outside, e.g. at an angle of 45°, as is shown by means of the arrow in FIG. 14. During the motion thereof into the workpiece, the tool is controlled in a determined, desired track of motion by means of suitable software. In this connection, chip removal takes place along the part cutting edges on the cutting insert that extend clockwise from the contact point Q. From the point Q, the aforementioned clearance edge 43 extends rearwards at a certain angle to the linear track of motion in which the point Q moves when the cutting insert is moved in the direction of the arrow in FIG. 14. More precisely, the edge 43 is somewhat inclined counter-clockwise in relation to said track of motion. This means that the edge 43 clears from the machined surface, as is more clearly shown in FIG. 15.

In practice, the machining can be effected in one single step or pass. The cutting insert is moved obliquely laterally according to FIG. 14 to the desired cutting depth, and then the insert is moved towards the center of the groove in the leftwards direction according to the arrow in FIG. 16. When the machining of the inclined shoulder surface 23 has been completed and the point Q reaches the position according to FIG. 15, the cutting insert assumes a position in which the contour shape of the cutting edge from the point Q approximately up to the edge 47 (see FIG. 10) decides the final profile shape in one side of the groove. From the position according to FIG. 15, the cutting insert is brought perpendicularly to the symmetry plane R of the groove in the leftwards direction inwards in order to finally clear when the same reaches up to the countersink.

The opposite side of the groove is turned in the same way, but by means of a tool having a right-hand mounted cutting insert (according to FIG. 12).

Advantages of the Invention

A fundamental advantage of the tool according to the invention is that the same is robust and thereby ensures a stable, vibration-free turning, which results in the machined surfaces, in particular the vital, inclined shoulder surfaces in the hollow space of the groove becoming smooth and dimensionally accurate. To said stability, a plurality of factors contribute. Among other things, the described ridge teeth or locking means in the interface between the cutting insert and the cutting seat guarantee that the cutting insert can be located in a very exactly definable position, as well as be retained in a reliable way in the same position during turning. In doing so, the long bracket and the appurtenant support part ensure that the cutting insert in an exact way maintains the tangential position thereof in relation to the rotary workpiece also in situations when the cutting insert is exposed to very large cutting forces.

Also, the described coupling element in the rear part of the basic body contributes to the stability of the tool. By the fact that said coupling element (in a known way, per se) has a tapering shape and a polygon-shaped cross-section, an extremely good fixation of the basic body in the appurtenant machine is guaranteed. In this way, each tendency of the basic body and the cutting insert, respectively, to be angularly displaced is counteracted in an effective way.

Another advantage is that one and the same cutting insert is universally usable for right-hand turning as well as left-hand turning tools. By the unique tapering shape of the support part of the insert-carrying bracket, it is further guaranteed that the cutting insert can be inserted into the described groove and machine an inwardly turned shoulder surface without the bracket colliding with the workpiece. Since the cutting insert is fed-in obliquely, e.g. at an angle of 45°, in the groove and has a positive chip angle, the released chip will exit the groove via the thin gap without hitting the opposite side of the groove. In other words, chip stopping is avoided. This in turn entails that the need for after-treatment disappears or is reduced.

Also, the number of requisite finishing steps is reduced, more precisely to two, viz. a machining of the left side of the groove and a machining of the right side thereof. The work of getting the desired grooves ready is furthermore shortened by the fact that the tools can be mounted and removed with minimal set-up times.

Feasible Modifications of the Invention

The invention is not limited only to the embodiments described above and shown in the drawings. Thus, the basic body included in the tool as well as the replaceable cutting inserts may be modified in miscellaneous ways. For instance, it is feasible for the fixation of the cutting insert in the cutting seat of the basic body to be achieved by means other than cross serrations of the type exemplified in the drawings. Although the cutting insert suitably has a heart-like contour shape, the individual details may be modified. For instance, the long clearance edge extending between the two cutting edges may be formed concavely arched instead of straight.

In conclusion, it should be pointed out that the described tool primarily is intended for turning in metallic workpieces, the basic body advantageously being made from steel or the like, while the cutting insert is made from cemented carbide, ceramic metals or the like.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for the fine-turning of grooves in workpieces, comprising:
    a basic body including a rearwardly extending mounting part, and a forwardly projecting bracket, the bracket including a narrow neck part and an enlarged support part disposed at an end of the neck part, the support part forming an insert seat, the support part extending laterally from the neck part wherein the support part is arranged asymmetrically with respect to a center line of the basic body extending in a front-to-rear direction through the neck part and the mounting part; and
    a cutting insert including a top side, a bottom side, and a peripheral clearance surface extending between the top and bottom sides, the bottom side being supported on the insert seat, the insert including two spaced-apart convexly arched side cutting edges arranged wherein the center line passes therebetween, a hole provided for receiving a fastening screw, the bottom side and the insert seat including mutually engaging stabilizing structures preventing angular displacement of the insert about an axis of the hole.

2. The tool according to claim 1 wherein the bracket includes a length measured parallel to the axis of the hole, and the support part defines a width measured in a direction perpendicular to the length and perpendicular to the center line, wherein the length is at least three times longer than the width.

3. The tool according to claim 2 wherein the insert has a thickness measured from the top side to the bottom side, the length of the bracket being at least five times greater than the thickness of the insert.

4. The tool according to claim 1 wherein the bracket includes a length measured parallel to the hole, and the insert has a thickness measured from the top side to the bottom side, wherein the length is at least five times greater than the thickness.

5. The tool according to claim 1 wherein the neck includes first and second planar opposite side surfaces oriented parallel to the axis of the hole, the first side surface transforming into the support part by an arched transition portion.

6. The tool according to claim 1 wherein the support part tapers from the insert seat in a rearward direction toward the mounting portion.

7. The tool according to claim 6 wherein a cross section of the support part becomes smaller in a downward direction away from the insert seat.

8. The tool according to claim 1 wherein a cooling fluid conduit extends through the basic body and exits at the support part for directing cooling fluid toward the insert.

9. The tool according to claim 1 wherein a portion of the bottom side of the insert disposed beneath the first cutting edge is flush with a side of the support part.

10. The tool according to claim 5 wherein an edge portion of the insert seat forms an obtuse angle with the side surface of the neck part as the insert seat is viewed in a direction parallel to an axis of the hole, the obtuse angle being at least 125°.

11. The tool according to claim 10 wherein the obtuse angle is at most 140°.

12. The tool according to claim 1 wherein the mounting portion has a polygon-shaped cross section.

13. The tool according to claim 1 wherein the stabilizing structures comprise projections and grooves receiving the projections.

14. The tool according to claim 13 wherein the recesses are formed in the bottom side of the insert and comprise grooves oriented perpendicular to one another in a cross-like configuration, the projections comprising ridges formed on the insert seat and arranged in complementary fashion to the grooves.

15. The tool according to claim 14 wherein one ridge extends perpendicular to the edge portion which forms the obtuse angle with the first side surface of the neck part.

16. A cutting insert comprising a top side, a bottom side and a peripheral clearance surface extending between the top and bottom sides, a hole extending from the top side to the bottom side for receiving a fastener, the top side having first and second spaced apart convexly arch-shaped cutting edges, the bottom side including stabilizing structure arranged for preventing angular displacement of the insert about an axis of the hole; the first and second convex cutting edges being spaced part by a front edge of the insert and disposed, respectively, on opposite sides of a symmetry plane which intersects the front edge and passes through a center line of the hole; the insert configured symmetrically about the symmetry plane; each of the first and second cutting edges defining a laterally outermost region of the insert spaced farthest from the symmetry plane in a direction perpendicularly thereto; each laterally outermost region spaced from a second plane passing though the hole's center perpendicularly to the symmetry plane, such spacing being in a direction toward the front edge; wherein the first and second cutting edges converge toward one another in a direction away from the front edge.

17. The insert according to claim 16 wherein each of the first and second cutting edges comprises a plurality of edge parts having different respective radii of curvature.

18. The insert according to claim 16 wherein the first and second cutting edges converge rearwardly toward a rear edge of the insert, the rear edge being shorter than the front edge and extending parallel thereto.

19. The insert according to claim 16 wherein the stabilizing structure comprises grooves projecting from the bottom side and intersecting one another.

20. The insert according to claim 19 wherein the grooves are oriented perpendicular to one another.

21. The insert according to claim 20 wherein one of the grooves extends midway between the first and second cutting edges.

22. The insert according to claim 21 wherein each of the grooves intersects a center axis of the hole.

23. The insert according to claim 16 wherein the top side is planar.

24. The insert according to claim 16 wherein the clearance surface extends at an acute angle to the top side.

25. A cutting insert comprising a top side, a bottom side and a peripheral clearance surface extending between the top and bottom sides, a hole extending from the top side to the bottom side for receiving a fastener, the top side having first and second spaced apart convexly arch-shaped cutting edges, the bottom side including stabilizing structure arranged for preventing angular displacement of the insert about an axis of the hole, wherein each of the first and second cutting edges comprises a plurality of edge parts having different respective radii of curvature.

26. The insert according to claim 25 wherein the front edge is linear and intersects the first and second cutting edges tangentially thereto.

* * * * *